Dec. 23, 1969  O. J. HAWKS  3,485,059
VEHICLE AIR-CONDITIONING SYSTEM WITH THEFT PREVENTION MEANS
Filed Sept. 3, 1968  4 Sheets-Sheet 1

INVENTOR
OTIS J. HAWKS

BY Watson, Cole, Grindle & Watson
ATTORNEYS

Dec. 23, 1969  O. J. HAWKS  3,485,059
VEHICLE AIR-CONDITIONING SYSTEM WITH THEFT PREVENTION MEANS
Filed Sept. 3, 1968  4 Sheets-Sheet 2

INVENTOR
OTIS J. HAWKS

BY Watson, Cole
Grindle & Watson
ATTORNEYS

Dec. 23, 1969    O. J. HAWKS    3,485,059
VEHICLE AIR-CONDITIONING SYSTEM WITH THEFT PREVENTION MEANS
Filed Sept. 3, 1968    4 Sheets-Sheet 3

INVENTOR
OTIS J. HAWKS

BY *Watson, Cole, Grindle & Watson*
ATTORNEYS

Dec. 23, 1969     O. J. HAWKS     3,485,059
VEHICLE AIR-CONDITIONING SYSTEM WITH THEFT PREVENTION MEANS
Filed Sept. 3, 1968     4 Sheets-Sheet 4
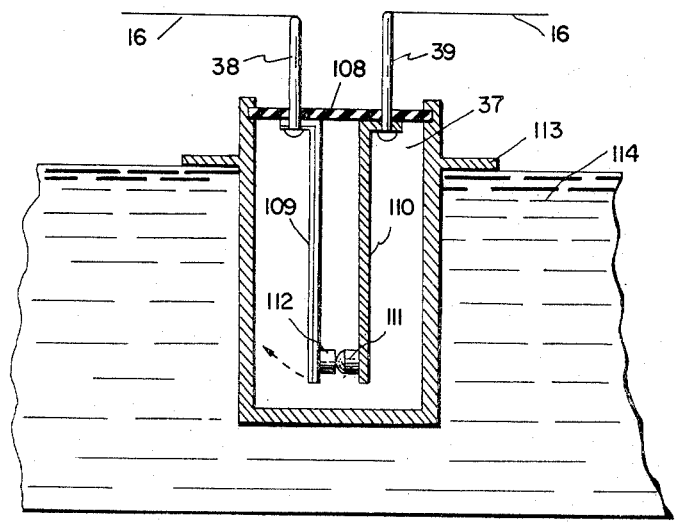
FIG. 8
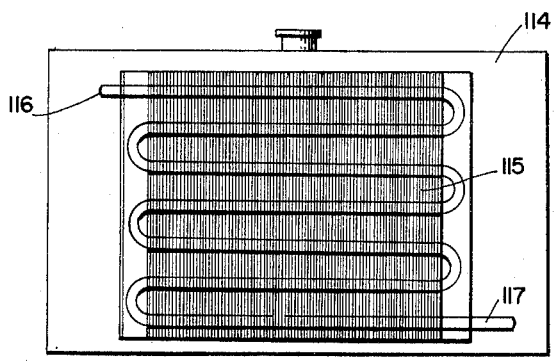     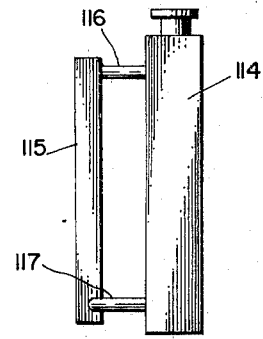
FIG. 9     FIG. 9A
INVENTOR
OTIS J. HAWKS
BY Watson, Cole,
Grindle & Watson
ATTORNEYS

United States Patent Office 3,485,059
Patented Dec. 23, 1969

3,485,059
VEHICLE AIR-CONDITIONING SYSTEM WITH THEFT PREVENTION MEANS
Otis J. Hawks, Portsmouth, Va., assignor of fifty percent to Charles E. Russell, Portsmouth, Va.
Filed Sept. 3, 1968, Ser. No. 757,524
Int. Cl. F25b 27/00; B60h 3/04; F02d 35/00
U.S. Cl. 62—209                                 7 Claims

ABSTRACT OF THE DISCLOSURE

A control device for a motor vehicle air-conditioning unit capable of permitting uninterrupted operation of the unit and rendering the vehicle safe from theft by unauthorized users while the engine is running and the vehicle is vacated. The ignition switch is simply turned off, locked and the ignition key removed so that an auxiliary electrical circuit, closed by a steering column switch, temperature sensitive switch and a pressure sensitive switch, acts to continue supply of current to the unit for constant cooling of the vehicle.

---

This invention relates to the control of motor vehicle cooling devices designed to cool the temperature inside the passenger space of a motor vehicle, as relative to the ambient temperature level surrounding the exterior of the said vehicle.

All such devices now in use depend on power of the engine when running, to rotate the air conditioning compressor. This is accomplished by means of an electromagnetic clutch which engages for rotating said compressor when the air passing over an evaporator coil reaches the level at which a thermostat is set by a control, which control is set at the operator's will. Rotation of the compressor causes a compression of the refrigerant gas until it is in a liquid state and stored in a receiver tank, then allowed to expand in a controlled manner thereby creating a cooling effect. Such a cooling process is well known to those skilled in the art, therefore no detailed explanation is necessary.

There are many air-conditioner disclosures in the art which are very effective, reliable and sophisticated. However, as stated above, all are dependent on the running of the vehicle engine so that, when the vehicle is parked or left unattended as on a parking lot of a store or shopping center, the cooling effect is also stopped, unless the engine is left running, either with the ignition switch left on and the keys left in the vehicle, or with the keys left in the ignition and the doors locked. This presents a most undesirable and hazardous situation because, the sight of a vacant automobile with its engine running, only invites unauthorized appropriation of the motor vehicle by some stranger.

Tests have shown that the temperature inside the passenger space of the vehicle under the direct rays of the sun, will rise five to fifteen degrees above the ambient exterior temperature level within a time period of approximately five to ten minutes. The result of this is felt more drastically by the operator of the vehicle after returning for example, from an air-conditioned building, to his parked car which is several degrees higher on the inside than the ambient exterior temperature level. Also, if repeated stops are to be made within a matter of a relatively short period, the air conditioning system of the vehicle is usually unable to dissipate the heat generated within the passenger area during the previous stop.

Further tests have shown that when this invention is being used, the vehicle may be left, unattended, directly under the sun's rays, with the air conditioner operating while the outside temperature level is approximately 87° F. for a period of at least 25 minutes, or for a period of 15 minutes while the outside temperature level is approximately 95° F. However, at this temperature level, it is wise to reduce the speed of the fan blowing over the evaporator, and to lower the thermostatic control. Also, for geographic locations experiencing temperatures in excess of 90° F. a large portion of the summer, I have provided a finned coil which is attached to the radiator and provides the necessary cooling to accommodate the higher temperature levels.

There are at present, and have been for a number of years, two general types of motor vehicular transmissions namely, the hydraulic or automatic shifting type, in which various ratios of engine revolutions per minute as related to vehicular speed are automatically accomplished, usually by hydraulic pressure means. As the vehicular speed is increased a higher gear ratio is automatically selected within the so-called automatic transmission until the r.p.m.'s of the engine match the r.p.m.'s of the drive shaft, commonly known in the the art as "high gear."

The other type transmission in common usage is the so-called manual transmission utilizing a spring loaded clutch forming a direct linkage from the motor to the transmission unless the clutch pedal is depressed by the operator, separating the clutch plates, and thereby disconnecting the engine from the transmission during which period any gear higher or lower may be selected by the operator.

This is important since my invention is adaptable to either type transmission with little or no change in the major parts of the control device.

In the case of an automatic transmission the position of "PARK" is utilized to activate the instant invention although the position of "NEUTRAL" could be made as a substitute for "PARK" position, if desired. The control lever is usually mounted on the steering column at an angle approximately perpendicular thereto and the gears are selected by the movement of this lever in a clockwise or counter-clockwise direction as desired. As a rule, the "PARK" position is selected by the limit of counter-clockwise motion, and in the case of a manual or "STICK SHIFT" the position of neutral is utilized to activate this invention.

It should be noted that the invention is not directed to changes or improvements to air conditioning units but to new and useful controls for such units comprising a combination of three separate electric switches operated by current from the vehicle battery. Such current may be referred to as an "extraneous source of current," since it is derived directly from said battery, and is in no way dependent upon the position of the ignition switch for electrical energy. Placing of the gear level in "PARK" position closes one of the electrical switches, which is normally open, so that it is in series with a pressure sensitive electric switch, normally in a closed position, but open upon the stalling of the engine caused by movement of the gear level out of "PARK" position. The third switch which is temperature sensitive, is also normally closed and is also wired in series with the other two switches, and is attached to the radiator of the engine and opens when the temperature rises above a set level. This action stops the motor vehicle engine and consequently the air conditioner to prevent boiling. However, this in no way prevents the operator from immediately starting the engine by inserting the ignition key and using the self starter in the usual manner. The above described action applies in the case of an automatic transmission.

In the case of a manual "STICK SHIFT" transmission, the first electric switch, normally open, would be closed when the transmission lever reaches the neutral position and is connected in series to the pressure responsive electrical switch, normally closed, unless the engine is stalled or overheated as is the case with the automatic transmission. This prevents extraneous battery current from reaching the ignition coil or the electromagnetic clutch.

The pressure sensitive electric switch may be responsive to a positive or a negative pressure. When such a switch is connected to the intake manifold, a negative pressure or a less than atmospheric pressure is present whereas a positive pressure above the ambient is present in the oil pressure created by the engine's oil system, or the oil pressure created by the automatic transmission's pump pressure.

Although I prefer the use of a vacuum created in the intake manifold to operate the pressure sensitive electric switch, this is in no way limiting since this second valve or pressure sensitive valve can conceivably be operated by any change in pressure level created by the engine of the vehicle when running, as compared to a stalled or static condition, such as created by a disconnection of the extraneous current from the battery of the motor vehicle.

The gear lever is moved from the "PARK" position in the case of an automatic transmission or from "NEUTRAL" in the case of a manual shift transmission to break the continuity of the extraneous supply of current to the ignition coil.

As hereinabove mentioned, the novelty of this invention is contained in the combination of three electrical switches, one sensitive to the movement of the gear lever and wired in series with a pressure sensitive switch which is normally closed when the vehicle engine is running and open the instant the engine stops rotating. This pressure sensitive switch makes the contact of extraneous battery power to the coil as will be described later in detail in the specification of this application.

It should be understood that this invention is readily adaptable for installation in existing motor vehicles already equipped with air-conditioning units or about to be so equipped or for installation in newly manufactured motor vehicles in the factory.

Therefore, it is an object of this invention to provide an air-conditioning control device having an electric switch, normally open, connected to the motor vehicle battery on the non-grounded side thereof and transmitting current when it is closed by placing the gear lever in the "PARK" position as in the case of an automatic transmission, or in the "NEUTRAL" position as in the case of a gear box or manual transmission. In either case, such a switch is then placed in series with a second switch which is pressure sensitive and is normally closed when the engine is running and is wired directly to the ignition coil on the same primary coil terminal as that to which the standard ignition switch is connected.

Another object of this invention is to provide a control device of the character described having a pressure sensitive switch which will prevent current from reaching the ignition coil when the engine is stopped or stalled but will not become closed again until the engine is restarted.

A further object of this invention is to provide a control device as aforedescribed having a normally closed temperature sensitive switch which, when heated by the fluid of the radiator to open at a predetermined temperature, breaks the continuity of extraneous current, allows the pressure sensitive electric switch to open, and remains open until the ignition switch key is inserted in the lock, the ignition turned on, and the engine started in the usual manner.

A still further object of this invention is to provide a simple and easily installed device to the water cooling radiator of the motor vehicle engine, to provide dissipation of heat created by the engine when the vehicle is parked for long intervals and the engine left running with the air conditioner operating to cool the passenger area of said vehicle.

A still further object of this invention is to provide a control device having the series of switches as previously mentioned, which will prevent the battery current from reaching the ignition coil even if the gear lever is moved, and again returned to its original position of "PARK" or "NEUTRAL," as the case may be.

A still further object of this invention is to provide a mechanism as described above which will render the car theft proof.

Other features and advantages of the invention will be apparent from the following detailed description thereof which is made with reference to an embodiment illustrated in the accompanying drawings. It will be understood, however, that the detailed descriptions made with reference to the illustrated embodiment are for the purpose of facilitating an understanding of the invention and that the invention is not to be construed as limited to the described and illustrated details, as various changes and modifications thereof will be apparent to those skilled in the art to which the invention is related. Also, while I have shown various embodiments of my invention, it should be understood that the principles thereof may be extended to many and varied types of apparatus, for instance, the automobile heater may be controlled simultaneously, simply by extending the extraneous current to the heater switch, as will immediately be apparent to those skilled in the art of this invention.

FIGURE 8 is an enlarged sectional view of the heat sensitive electric switch taken along line 8—8 of FIGURE 1.

FIGURE 9 is a front elevational view of the finned coil attachment for the radiator.

FIGURE 9A is a side view of FIGURE 9.

Figure 1:
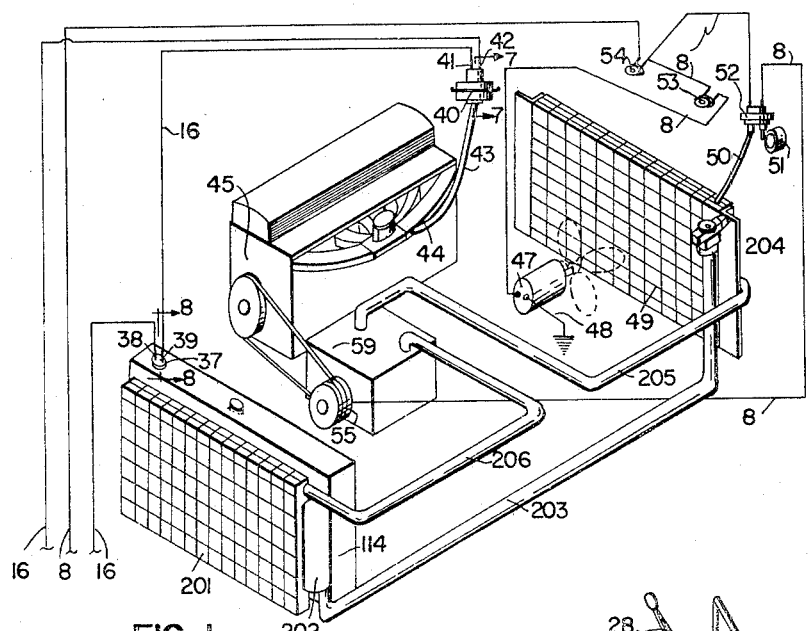
FIGURE 1 is a perspective illustration of a typical automotive air conditioner unit also showing the engine and the pressure sensitive electrical switch of the instant control device.
Figure 2:
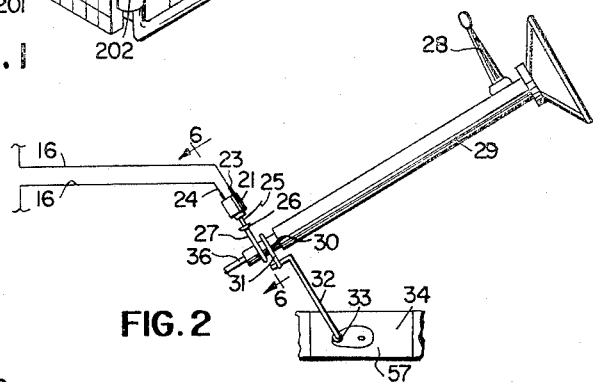
FIGURE 2 is a perspective illustration of a typical gear control lever mounted on the steering column and including the position sensitive electrical switch of the present design.
Figure 3:
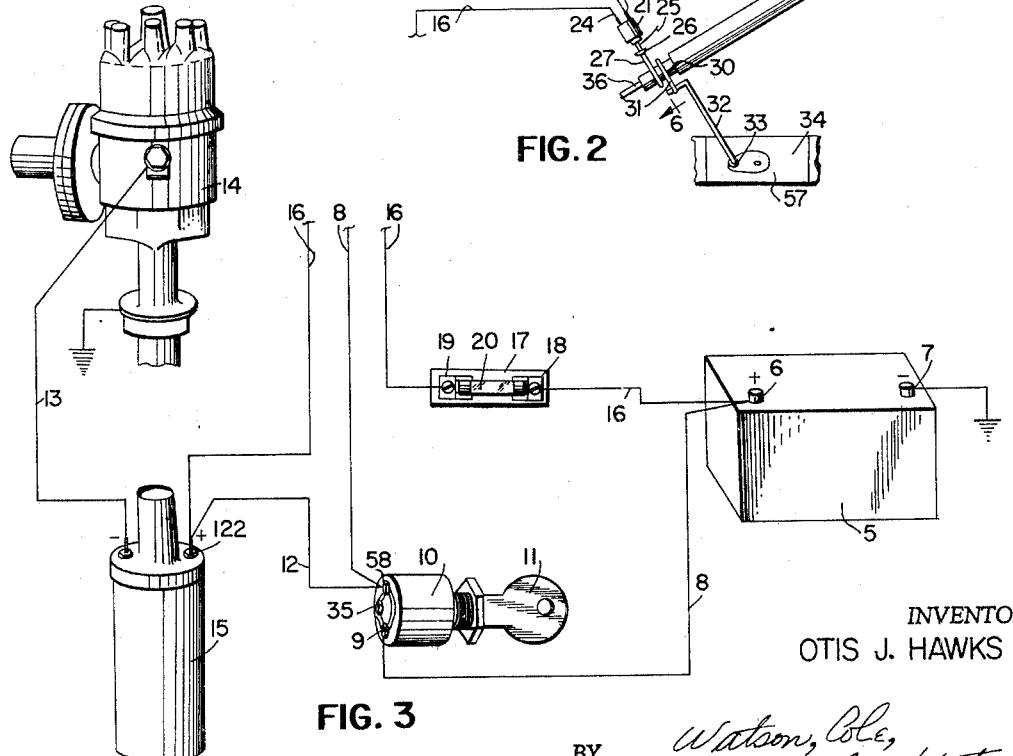
FIGURE 3 is a perspective view of a typical battery and ignition system.

In FIGURES 1, 2 and 3 of the drawings, certain parts of the standard automobile are shown together with the components of my control device, to be hereinafter described in detail, in order to aid in a complete understanding of the invention.

Turning to FIGURE 3, it can be seen that the car battery 5 is grounded, in the usual manner, from the negative terminal 7 while the positive terminal 6 is connected by the wire 8 to terminal 9 of the ignition switch. When the switch key 11 is placed in the lock 10 of the ignition switch and rotated to the "ON" position, terminals 9 and 58 are interconnected so that the current then travels along wire 8 where it is suitably attached to the ON-OFF switch 54 of the air conditioning unit, as shown in FIGURE 1. The wire 8 is then connected from the ON-OFF switch to one terminal of the rheostat 53 and, from the other terminal, wire 8 goes directly to the evaporator fan 47, said fan being grounded by wire 48 to complete the circuit. The wire 8 also leaves the same terminal of switch 54, enters the thermostatic control valve 52 and carries current to the opposite terminal to which wire 8 is attached and then carried directly to the electromagnetic clutch operating the clutch 55, which operates the compressor 59. The thermostatic valve 52 has a small copper tube 50 running directly to the condensor 49 to pick up the temperature there. It is adjustable by means of the knob 51 which causes the thermostat to open and close the circuit as the temperature of the air reaches the degree of coolness chosen by the vehicle operator.

The functional details of the air conditioner including compressor 59, condensor 201, receiver 202, expansion valve 204, evaporator 49 and their interconnecting conduits 206, 203 and 205, will not be described since it is believed well known to those skilled in the art.

Now assume that the operator of the vehicle wishes to stop for any reason and leave the engine 45 running so as to operate the air conditioner compressor 59, while leaving the vehicle unattended. To accomplish this, the operator places the gear control lever 28 of FIGURE 2 in the "PARK" position, in the case of an automatic transmission, or in "NEUTRAL" position, in the case of a gear box or manual transmission. The operator then turns the ignition switch 10 to the "OFF" position and removes the key 11, thus locking the ignition system.

Figure 6:
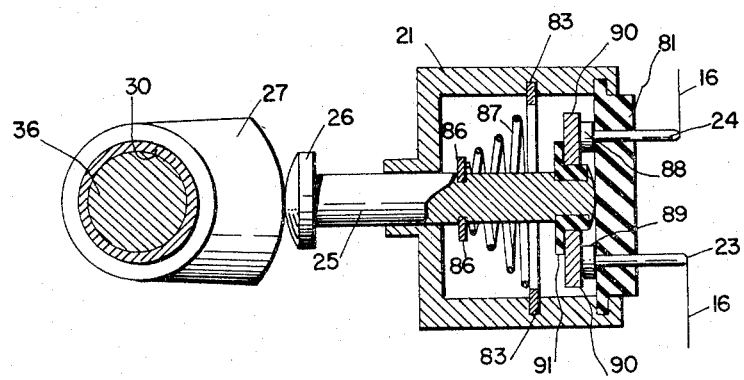
FIGURE 6 is an enlarged horizontal sectional view taken along line 6—6 of FIGURE 2, rotated clockwise approximately 135° and showing the operating cam in perspective.

My invention then provides extraneous current to the ignition coil 15 (FIGURE 3) in order to keep the engine 45 running, and produce power to turn the compressor 59 to produce air cooling. This is accomplished by providing the extraneous circuit 16 by attaching wire 16 to terminal 6 of the battery 5, and attaching the wire 16 to the fuse holder 17 at the terminal 18. The current then passes through fuse 20 to the terminal 19 and is further conducted to terminal 24 of the gear lever sensitive switch 21, by means of wire 16. The said switch 21, when closed, will conduct the extraneous current to terminal 23 and thus through the extension of wire 16 to the terminal 38 of the temperature sensitive switch 37, of FIGURE 1. The said gear lever position sensitive switch 21, as best shown in FIGURE 6, will be closed when the steering column mounted gear lever 28 of FIGURE 2 is placed in "PARK" position, in the case of an automatic transmission and in the "NEUTRAL" position, in the case of a gear box or manually operated transmission. This is accomplished by rotation of the gear shift tube 30 of FIGURE 2 and, being coaxial with the steering column 29, and steering rod 36, is rotated by the gear shift lever 28 through the cam 27, which is rigidly attached to gear shifting tube 30, and acts to push against the button 26 depressing switch shaft 25. The current conducting disc 90, attached to the switch shaft 25 and insulated therefrom by means of insulating washer 91, establishes contact and the switch 21 is closed. This allows current to be conducted from terminal 24 to terminal 23 and then through wire 16 to the temperature sensitive electric switch 37, best shown by FIGURE 8, and is normally closed, as shown, and will open only if the engine 45 becomes overheated.

As clearly shown in FIGURE 8 of the drawings, wire 16 is suitably attached to terminal 38, so that current is conducted through the bi-metal strip 109, through contacts 112, 111, through rigid strip 110 and on through terminal 39. The cap 108 is made of plastic or suitable insulating material preventing a short circuit between strips 109, 110. Line 16 then passes from terminal 39 to terminal 41 of the pressure sensitive switch 40, best shown by FIGURE 7.

Figure 7:
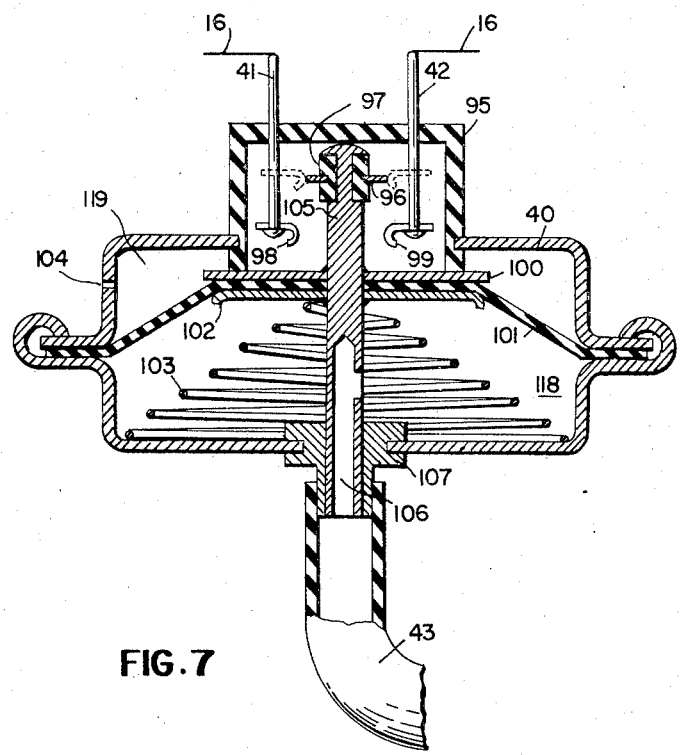
FIGURE 7 is an enlarged vertical sectional view taken along line 7—7 of FIGURE 1 showing the pressure sensitive electrical switch.

Should the engine 45 become overheated while the air conditioning unit is operating, the hot liquid in radiator 114 will cause the bi-metal strip 109 to expand in a direction away from contact 111, as shown by the arrow in FIGURE 7, thereby breaking circuit 16 and stopping the air conditioner. Of course, the bi-metallic strip 109 comprises two strips of metal, the one closest to contact 111 having a greater coefficient of expansion than the other so that an expansion in the direction of the arrow can be achieved.

Since the engine 45 is running, a vacuum is created in the intake manifold 44 and is transmitted through tube 43 and then on through port 106 located in the contact rod 105 and, thereby causes a reduced pressure of the atmosphere in the lower chamber 118 beneath the pressure plate 102 and the flexible diaphragm 101. This allows ambient atmosphere entering the port 104 to fill the upper chamber 119 and depress the upper pressure plate 100 and the diaphragm 101. The contact rod 105, being rigidly attached to the plates 100 and 102, is also depressed, thereby bringing into contact the conductive disc 96, which is insulated from rod 105 by the insulating bushing 97, with the contact springs 98 and 99, whereupon continuity of wire 16 is established from terminal 41, to terminal 42. Each of the terminals 41 and 42 are mounted in plastic cap 95 to prevent a short circuit between the two.

The wire 16 is suitably attached to the terminal 42 and returns to the positive terminal 122 of the ignition coil 15 (FIGURE 3), thus completing continuity of the extraneous circuit wire 16 from the positive terminal 6 of the battery 5, through the three switches to the coil 15 for current tnd thereby causing the engine 45 to run. However, since wire 16 and wire 12 are both connected to the positive terminal 122 of the ignition coil 15, current will be conducted from the wire 16 to the wire 12 to terminal 58 of the ignition switch 10, and since wire 8 is also attached to the terminal 58, current will be conducted to the air conditioning "ON AND OFF SWITCH" 54 and therefore the air-conditioner will run until the engine 45 is stopped. Of course, the negative pole of ignition coil 15 is electrically connected to the distributor 14 by means of a wire 13 in the usual manner. From the foregoing, it can be seen that the continuity of extraneous circuit 16 will be maintained so long as the steering gear lever 28 is left in "PARK" position, in the case of an automatic transmission, which will cause the relative alignment of cam 27 and button 26 as depicted in FIGURE 6.

Now, in the case of a gear box or manual shift transmission 57, which is shifted by means of the steering column mounted shift lever 28, the same alignment of cam 27 and button 26 shown in FIGURE 6 will be attained when the lever 28 is placed in a "NEUTRAL" position. In either case, it will readily be seen that the movement of lever 28 from the positions described above, will result in the rotation of gear shift tube 30 of FIGURE 2, rotating with it the cam 27, which movement will immediately cause cam 27 to rotate away from the button 26. This action will allow spring 87 of switch 21, FIGURE 6, to press the switch rod 25 and therefore the contact disc 90 away from the contact buttons 88 and 89 thus breaking the continuity of circuit 16. Such is accomplished by the spring 87 exerting pressure on the snap ring 86, embedded in the switch rod 25, and the opposite end of said spring 87, deriving stability from the snap ring 83 which is embedded in the side walls of switch 21.

The breaking of the continuity of circuit 16 cuts off the supply of current to coil 15, FIGURE 3, and thus the motor 45 of FIGURE 1 will stall, since it has already been stated that the operator turned the ignition switch 10 to the "OFF" position and removed the key 11.

The stalling of motor 45 will destroy the vacuum existing in the intake manifold 44 of FIGURE 1 and thereby allow the ambient level of atmosphere to enter the tube 43 and the port 106 filling the lower chamber 118, FIGURE 7 of the pressure sensitive valve 40. Since the upper chamber 119 is in contact with the ambient atmosphere through the port 104, the pressure plates 100 and 102, as well as diaphragm 101, will be in atmospheric balance. The spring 103, bearing against the bottom of lower chamber 118 and exerting its pressure against the pressure plate 102, forces said pressure plate 102, diaphragm 101, and valve rod 105 upward to assume the position shown in FIGURE 7. From this it will be seen that the continuity of circuit 16 is again broken, since contact disc 96 has been pushed upward and is no longer engaged with the contacts 98 and 99.

Therefore, the movement of gear lever 28 to its original position whether to "PARK" in the case of an automatic transmission or "NEUTRAL," in the case of a manual shift, will not reestablish continuity of extraneous circuit 16. No current can therefore reach the coil 15, the electro-magnetic clutch 55 nor the evaporator fan 47, until the key 11 is in the ignition switch 10, and turned to the "ON" position and the motor started in the usual manner through the wire 35 of FIGURE 3, which is brought into contact with wire 8 attached to the terminal, by turning key 11 clockwise beyond the "ON" position.

Up to this point, I have dealt with automatic transmissions and the manual or gear box transmission when operated by a steering gear column mounted shift lever 28 such as shown in FIGURE 2, together with the associated typical linkage such as arm 31, linkage rod 32 and gear selector arm 33.

Figure 4:
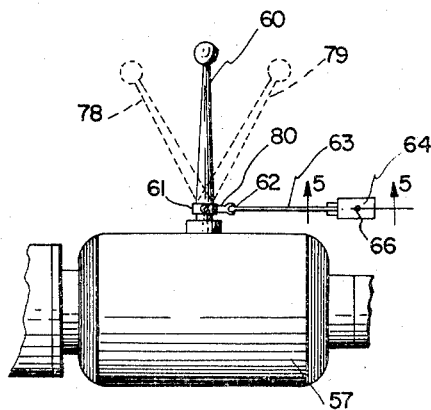
FIGURE 4 is a perspective view of a typical gear box transmission and its association with the "STICK" sensitive electrical switch.
Figure 5:
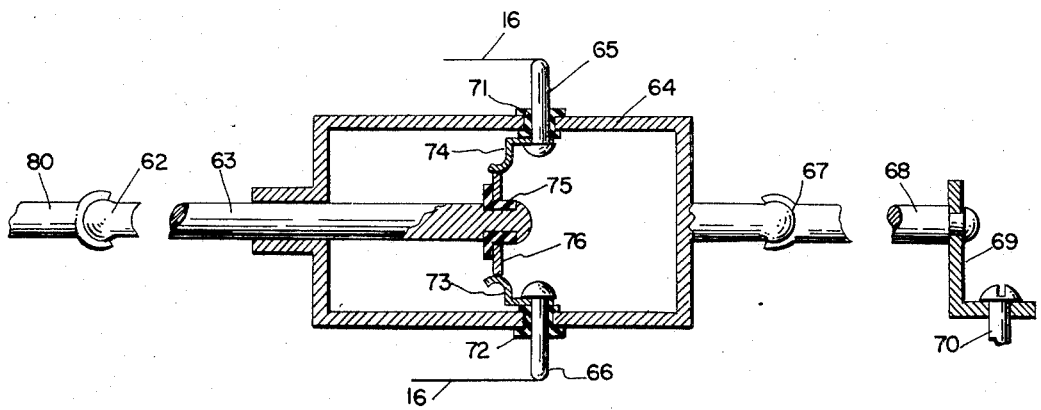
FIGURE 5 is an enlarged horizontal sectional view taken along line 5—5 of FIGURE 4.

However, in some cases the gear lever is mounted on the floor of the car as best shown by FIGURE 4, and operated by a lever such as 60 and is commonly referred to as a "STICK SHIFT." This type of mounting is employed variously to operate a manual or automatic transmission. In FIGURE 4, however, it is shown as operating a manual or gear box transmission 57. In this illustration, a collar 61 is shown with an extension arm 80 terminating in a ball joint, which is attached to switch arm 63 of the switch 64. This switch is shown in FIGURE 5 with the switch closed, as it would appear when the gear lever is placed in "NEUTRAL." It will be seen that the contact disc 76 is insulated from the switch rod 62 by the plastic bushing 75 and establishes continuity between contacts 73, 74. Also, terminals, 65, 66 are insulated from the switch 64 by plastic bushings 71, 72. The right hand end of switch 64 terminates in another ball joint 67 and extension rod 68, which is rigidly attached to bracket 69, and secured to the automobile at any convenient location by fastener 70.

The entire process of establishing continuity of the extraneous circuit 16 is the same as has been described in detail above when the steering column mounted lever 28 was used, except that in the case of the floor mounted or "STICK" shift, the switch 64 of FIGURE 5 is substituted for the switch 21 of FIGURE 6, and the wires 16 are transferred from the terminals 23, 24 of the switch 21 to the terminals 65, 66 of switch 64, shown in FIGURE 5.

Any movement of the gear lever 60 of FIGURE 4 from its "NEUTRAL" position such as positions 78 and 79 shown in dotted lines, would obviously open the switch and break the continuity of the circuit 16 with the same results as have been described in detail above.

Referring again to FIGURE 7 which shows pressure sensitive switch 40, it will be apparent to anyone skilled in the particular art of this invention, that a positive pressure for closing switch 40 could be supplied from any source available from the running engine 45 and fed through the tube 43 to fill the lower chamber 118 and act to push the pressure plates 100, 102 and the diaphragm 101 upward until contact disc 96 is in the position shown. The atmosphere in the upper chamber 119 can escape through port 104. The two spring contacts 98 and 99 would be located higher, as shown in dotted lines to establish contact with the disc 96. The spring 103 in this case would have its largest diameter rest against the top of the upper chamber 119 and exert its force downward against the pressure plate 100 and would obviously break the continuity of the switch 40 when the engine stalled, and the positive pressure is thereby relieved. By the term positive pressure, I mean one that is above the ambient atmospheric level.

As shown in FIGURES 9 and 9A, an auxiliary radiator 115 having coils 116, 117, can be provided on radiator 114, if desired, in order to increase the water capacity in the cooling system under those conditions or in those sectors of the country where extremely high temperatures over long duration are experienced.

From the foregoing description, it can be seen that a control device has been designed for sustained operation of a motor vehicle air-conditioning unit without fear of theft or unauthorized appropriation of the vehicle since the ignition switch may be turned off, locked, and the ignition key removed even while the engine is running and continuing to operate the air conditioner. The control device of the instant invention is easy to operate, install and manufacture since only the aforedescribed switches and their accompanying circuitry are required for simple and reliable operation of the device.

Obviously, many modifications and variations of the present invention are possible in light of the above teachings. It is therefore to be understood that within the scope of the appended claims the invention may be practiced otherwise than as specifically described.

What is claimed is:
1. In an air-conditioning unit driven by the engine of a motor vehicle upon starting of the engine by means of an ignition switch key, a gear selector means properly positioned, and an ignition switch for said key, said switch being electrically connected to both the motor vehicle battery and the ignition coil means, the improvement consisting of a control device for said unit comprising:
   a first switch means secured to said gear selector means, said first switch means being made to open and close by said selector means;
   a second switch means responsive to a source of pressure from said engine, said second switch means being made to open and close by means of a pressure differential therewithin; and
   an extraneous electrical circuit means electrically connecting said battery, said first switch means, said second switch means, said ignition coil means and said ignition switch, in series, whereby said unit will continue to operate since said engine cannot be made to stall by the turning of said key to its normally off position but only by means of a break in said circuit as said first switch means is made to open by said selector means or as said second switch means is made to open by said pressure differential.

2. In an air-conditioning unit as in claim 1 wherein said gear selector means comprises a steering column, a gear shift lever and means on said lever cooperable with said first switch means through movement of said lever for opening and closing said first switch means.

3. In an air-conditioning unit as in claim 2 wherein said first switch means comprises a switch housing and a plunger resiliently mounted therein for movement in and out of said housing, said plunger having a head and extending out of said housing and a tail end wholly within said housing, and wherein said cooperable means on said lever comprises a cam disc secured to said lever whereupon, movement of said lever rotates said cam disc against said plunger head end for movement of said plunger tail end in and out of engagement with said circuit means for respectively closing and opening said first switch means.

4. In an air-conditioning unit as in claim 2 wherein said first switch means comprises a switch cover and a rod slideably mounted therewithin, said rod having a head end extending out of said cover and a tail end wholly within said cover, and wherein said cooperable means on said lever comprises a link secured to said lever and to said rod head end whereupon, movement of said lever slides said rod tail end in and out of engagement with said circuit means for respectively closing and opening said first switch means.

5. In an air-conditioning unit as in claim 1 wherein said second switch means comprises a second housing, a second plunger resiliently mounted therein, and a diaphragm means within said second housing, said second housing having an aperture therein on one side of said diaphragm and open to atmospheric pressure, said second plunger being secured to said diaphragm and having a head end and a hollow bore tail end opening to the other side of said diaphragm, and a flexible hose connecting said second plunger tail end with said engine source of pressure whereby, a pressure differential between atmospheric on said one side of said diaphragm and other than atmospheric on said diaphragm other side causes said second plunger head end to move in and out of engagement with said circuit means for respectively closing and opening said second switch means.

6. An air-conditioning unit as in claim 1 wherein said control device further comprises a third switch means responsive to the temperature rise of the motor vehicle radiator, and wherein said circuit means further electrically connects said third switch means in series whereby said break in said circuit is further caused as said third switch means is open in response to said temperature rise.

7. In an air-conditioning unit as in claim 6 wherein said third switch means comprises a third housing in said radiator, a fixed plate and a movable plate within said third housing, each said plate having contact buttons thereon for maintaining continuity in said circuit means when in contact with each other, said movable plate including bi-metallic strips each having a different coefficient of expansion whereby, said contact buttons can be made to move out of contact with each other and open said third switch means as said bi-metallic strips expand away from said fixed plate upon a predetermined temperature rise in said radiator.

References Cited

UNITED STATES PATENTS

| | | | |
|---|---|---|---|
| 2,483,284 | 9/1949 | Jacobi | 123—198 |
| 3,186,184 | 6/1965 | Pruitt | 6—243 |

MEYER PERLIN, Primary Examiner

U.S. Cl. XR.

62—230, 244, 323; 123—198